US006492623B1

(12) United States Patent
Vilato et al.

(10) Patent No.: US 6,492,623 B1
(45) Date of Patent: Dec. 10, 2002

(54) PREFABRICATED SET FOR MAKING A COOKING SURFACE

(75) Inventors: Pablo Vilato, Paris (FR); Frederic Drujon, Machemont (FR); Jean-Francois Mikoda, Nointel (FR)

(73) Assignee: Eurokera, Chateau-Thierry (FR)

( * ) Notice: Subject to any disclaimer, the term of this patent is extended or adjusted under 35 U.S.C. 154(b) by 0 days.

(21) Appl. No.: 09/554,089

(22) PCT Filed: Sep. 23, 1999

(86) PCT No.: PCT/FR99/02259

§ 371 (c)(1),
(2), (4) Date: Oct. 10, 2000

(87) PCT Pub. No.: WO00/17579

PCT Pub. Date: Mar. 30, 2000

(30) Foreign Application Priority Data

Sep. 23, 1998 (FR) ............................................ 98 11841

(51) Int. Cl.[7] ............................... H05B 3/68; C09J 5/00

(52) U.S. Cl. .................................. 219/452.11; 156/305

(58) Field of Search ........................ 219/452.11, 452.12, 219/460.1, 461.1; 156/1, 304.6, 305, 306.6

(56) References Cited

U.S. PATENT DOCUMENTS

| | | | | |
|---|---|---|---|---|
| 3,866,018 A | * | 2/1975 | Hurko | 219/452.12 |
| 3,936,412 A | * | 2/1976 | Rocholl | 524/413 |
| 4,453,533 A | * | 6/1984 | Scheidler et al. | 216/452.12 |
| 6,175,102 B1 | * | 1/2001 | Stedron et al. | 219/452.11 |

* cited by examiner

*Primary Examiner*—Sang Paik
(74) *Attorney, Agent, or Firm*—Oblon, Spivak, McClelland, Maier & Neustadt, P.C.

(57) ABSTRACT

A prefabricated set for making a cooking top. The prefabricated set includes a glass ceramic hot plate and a frame including a part extending at the hot plate periphery and another part extending in a plane substantially vertical to the hot plate. At least one of the two frame parts includes an elastomer over-molding. A cooking top can be manufactured including such a prefabricated set.

21 Claims, 5 Drawing Sheets

PREFABRICATED SET FOR MAKING A COOKING SURFACE

BACKGROUND OF THE INVENTION

1. Field of the Invention

The invention relates to a prefabricated assembly, intended for the production of cooking tops, comprising a glass-ceramic plate or hob.

2. Discussion of the Background

Such cooking tops may include, inter alia, heating elements, such as radiant or halogen hotplates, and regulating means for varying the power of the latter.

These various elements are usually placed in a metallic structure called a "box" and are covered with a glass-ceramic plate equipped with a metal frame which encloses the structure.

The fitting of these cooking tops is completed by placing the glass-ceramic plate on the metal structure. Beforehand, the glass-ceramic plate and the frame are joined together by bonding using a silicone adhesive, which is suitable for such a use. This is because the silicone adhesive fulfils functions of different and complementary types.

Firstly, it allows the glass-ceramic plate to be held on the frame in a defined position; a cooking top thus produced may be easily transported, all the elements of which it is composed being fastened together, after fitting onto the box.

Another function of the silicone adhesive is to seal between the metal frame and the glass-ceramic plate.

The subassembly formed by the plate and the frame must, on the one hand, be well sealed so that water, for example the water used for cleaning the visible surface of the glass-ceramic plate, cannot penetrate inside and risk creating a short circuit. On the other hand, from a hygiene standpoint, since such a plate is used for the preparation of food, it is necessary to avoid any risk of fouling in the areas difficult to get at and impossible to clean, in order to prevent the development of germs.

Another function again fulfilled by the silicone adhesive is to dampen mechanical shocks. It thus prevents direct contact between the metal frame and the glass-ceramic plate and it can also compensate for expansions of the metal frame, the glass-ceramic hob having a virtually zero expansion coefficient. Another advantageous characteristic of the silicone adhesive is that it has good temperature resistance. Although the silicone adhesive is used only in the peripheral part of the glass-ceramic plate, and therefore at a certain distance from the heating areas, this temperature resistance must be high.

Thus, the periphery of the plate nevertheless undergoes a temperature rise when one or more hotplates are in operation. In addition, a heated vessel, such as a saucepan, may be placed on the edge of the plate and therefore exposes the frame to a high temperature.

A final function of the silicone adhesive is an aesthetic one: since at least part of the adhesive is deposited via the top, it is important to be able to smooth it so as to give it an attractive appearance since at least part may remain visible.

On the other hand, the fitting operation, consisting in bonding the glass-ceramic plate to the metal frame using an adhesive of the type mentioned above has several drawbacks.

In the first case, since the amount of adhesive needed is relatively large, the cost of this product is relatively high.

Another drawback is due to the curing time which increases with the amount of material, thereby leading to an increase in the manufacturing costs.

Finally, another drawback arises during the actual fitting. This is because glass-ceramic plates are usually delivered as they are to cooking-top manufacturers who are responsible for the assembly. A priori, such a factory assembly does not present insurmountable problems insofar as the operators do have the necessary tools. On the other hand, such assembly is much more difficult for an artisan who has to refit a glass-ceramic plate into a metal frame after an electrical-type repair has been made or else has to change this plate which may have been damaged. This is because it appears to be difficult for the artisan to fasten the glass-ceramic plate since he must both place the silicone adhesive around the periphery of the plate on the internal face and along the edges, smooth the adhesive in the visible area and keep the plate well centered, while pressing it during the above operations and during the time for curing the adhesive, which is relatively long, as mentioned above.

The removal of such a glass-ceramic plate is also not easy. The artisan must cut the silicone adhesive from below, that is to say on the lower face side of the glass-ceramic plate, and cut it from above, that is to say along the edge of the plate. These two operations, which must be carried out over the entire periphery, are not simple as the two cutting lines must meet in order to separate the two elements—the glass-ceramic plate and the metal frame. In addition, and more particularly when cutting on the internal face side of the glass-ceramic plate, it is not easy to make this cut without incurring the risk of scratching the lower face of the plate, which is the most fragile face of the plate.

This risk of scratching may lead to a risk of stress cracking and therefore to fracture of the plate. Removal of a glass-ceramic plate, for the purpose of refitting it later, therefore appears to be impossible or almost impossible to accomplish without damaging the plate.

Moreover, in order to refasten it to the frame, it is necessary to remove as far as possible all traces of silicone adhesive from the previous fitting, something which also incurs the risk of causing scratches, with the same consequences as before.

To remedy these drawbacks, it has already been proposed according to patent FR 2,744,201 to provide the glass-ceramic plate with a thermosetting profile overmolded around the lower peripheral part, which profile, by the use of suitable fastening means, allows the plate to be fastened to a metal frame without direct contact between the two.

It has also been proposed, especially in EP 0,449,347, to directly overmold, by a twin-shot injection molding technique, a plastic frame around the periphery of the glass-ceramic plate, the plastic frame then being fastened to a metal base, supporting the various heating elements.

This solution is not entirely satisfactory. Since the plastic frame is directly in contact with the upper part of the worksurface, the interface between these two parts is not sharply defined, particularly from a sealing standpoint. Consequently, the risk of fouling is considerable.

SUMMARY OF THE INVENTION

The inventors were therefore faced with the task of providing a prefabricated assembly of the type mentioned above, that is to say comprising a glass-ceramic hob and a frame, which makes it possible, once fitted into the cooking top, for the latter to have a very sharply defined interface with the worksurface for which it is intended.

To do this, the subject of the invention is a prefabricated assembly, intended for the production of a cooking top, comprising a glass-ceramic plate or hob and a frame consisting of a part extending around the periphery of the plate and of another part extending in a plane approximately vertical to the plate, wherein at least one of the two parts of the frame includes an overmolding made of an elastomer.

This is because the overmolding in the outer peripheral part of the frame makes it possible to ensure that there is a very well defined interface with the upper part of the worksurface, particularly from a sealing standpoint. This is because the elastic nature of the elastomer allows the profile to follow the shape of the worksurface as closely as possible, which may prove to be effective, particularly when the latter is not strictly plumb and/or when its surface finish is not uniform.

The frame according to the invention is preferably made of plastic. Advantageously, it is molded. Again preferably, it is made of a polymer resin resistant to temperatures of at least 180° C.

With regard to the connection between the glass-ceramic hob and the frame, it may be chosen to overmold the frame directly onto the hob instead of joining them together by a seal made of an elastomer.

Such a choice may be made especially according to the geometry of the manufacturing technique inherent in the frame.

In order to integrate the controls for the heating elements, other heating means such as gas burners and/or other functional elements for the glass-ceramic plate, such as a clock, the frame advantageously has emerging holes through which elastomer knobs are overmolded.

According to a very advantageous characteristic of the invention, the overmolding is a profile.

According to this same characteristic, each of the two aforementioned parts of the frame advantageously includes an elastomer profile.

Very advantageously, the elastomer profile of that part of the frame which extends in the approximately vertical plane of the plate consists of tabs, preferably having grooves. The flexible "tabs" of the overmolded profile make it possible, according to this embodiment, to perfectly immobilize the cooking top in the worksurface, even if the cutting of the latter has not been carried out to the desired tolerances. In this way, it is possible to avoid leaving a large gap between the vertical walls of the frame and the worksurface, which gap cannot be compensated for in this case solely by the presence of wedging pieces difficult to fit.

Another advantage provided by this embodiment of the invention is the guarantee of not damaging the worksurface when fitting the assembled cooking top into the latter.

The elastomer profile of that part of the frame which extends around the periphery of the plate preferably has a lip, thereby making it possible to avoid even further the risk of fouling.

Because of its elasticity, this lip, together with the aforementioned flexible retention elements, participates in pressing the frame onto the worksurface.

The elastomer of the overmolding according to the invention is advantageously a silicone.

The invention also relates to a cooking top incorporating a prefabricated assembly defined above, the frame of which is fastened to a base supporting heating elements, such as radiant or halogen elements and/or at least one atmospheric-gas burner and/or at least one induction heating means.

Finally, the invention relates to a process for manufacturing a prefabricated assembly according to the invention. According to this process, the following steps are carried out:

a) a molded frame is introduced into a punch of shape such that it is possible to inject an elastomer at the surface of at least one of the two parts of the frame;

b) a glass-ceramic hob is placed in the punch, slightly above the molded frame;

c) the assembly thus formed is closed by means of a die of shape at least partly complementary to the punch;

d) an elastomer is injected into the channels formed by the gap between the punch and the die;

e) the elastomer is cured; and then f) the assembly thus formed is ejected.

The advantages afforded by the invention are numerous. Firstly, since the elastomer is injected and then cured, it no longer has to be smoothed by hand, as could be the case according to the prior art, its surface finish no longer impairing the decorative appearance. Likewise, by injecting the elastomer onto a frame already formed, it is possible to use frames of varied shapes and/or colours. Such varieties contribute to the aesthetic appearance of the cooking top.

The varied shapes also make it possible to integrate into the frame items of equipment usually integrated into the plate, such as the members for controlling the heating elements, which usually require the plate to be extremely carefully drilled.

For reasons of manufacturing costs, the frame used according to the process of the invention is preferably made of plastic.

The elastomer used is advantageously silicone.

According to a very advantageous characteristic of the process, high-frequency curing is carried out in step e).

The fact of curing the elastomer according to the invention at high frequency also makes it possible to save a considerable amount of time in manufacture. In addition, in such a process, the tooling used is that normally used for an elastomer. Thus, the flexible contact between the tooling, particularly the mould, and the various parts forming the prefabricated assembly according to the invention incurs no risk of degrading the materials, especially the glass ceramic of which the hob is composed.

Thus, in industrial production the risk of scrap is reduced.

BRIEF DESCRIPTION OF THE DRAWINGS

Further details and advantageous characteristics will emerge below on reading detailed examples according to the invention, with reference to FIGS. 1 to 2*e* which represent, respectively.

DESCRIPTION OF THE PREFERRED EMBODIMENTS

Figure 1:
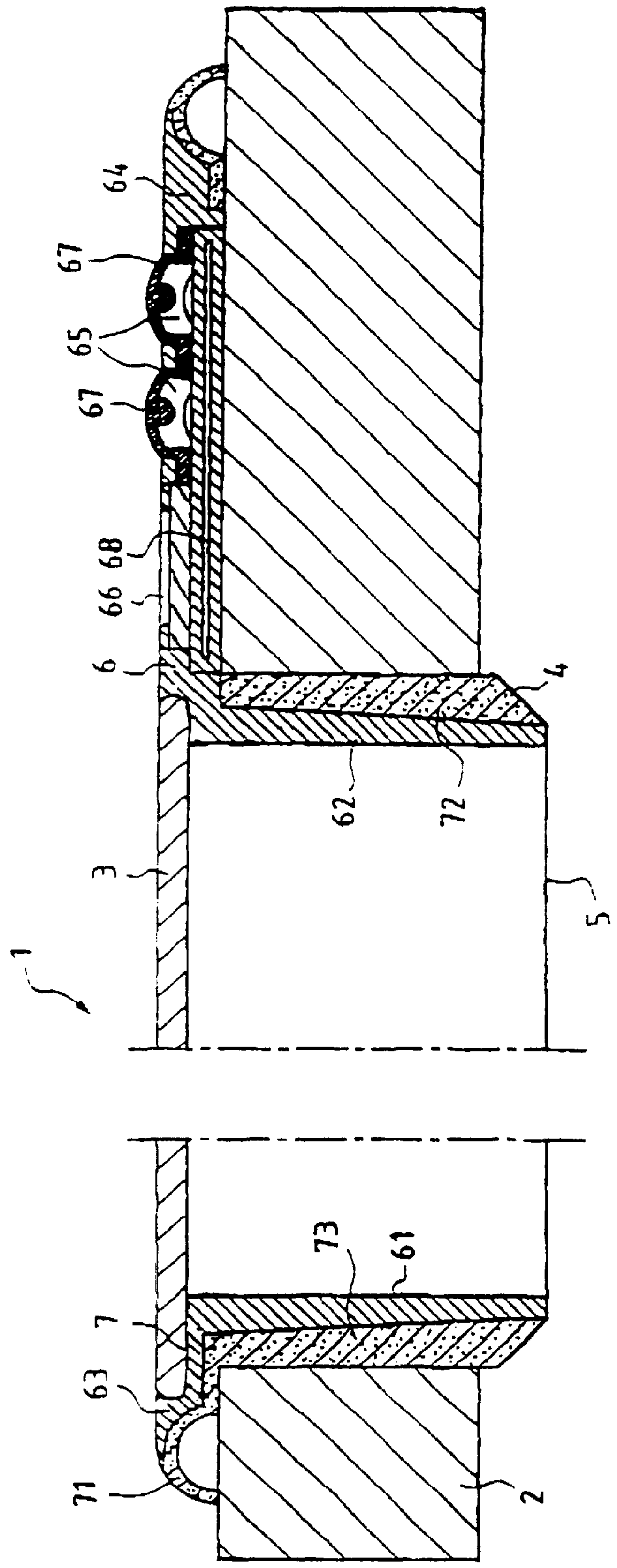
FIG. 1: a cooking top incorporating a first prefabricated assembly according to the invention and placed in a worksurface.

FIG. 1 is a sectional view showing a cooking top 1, made according to the invention, integrated into a worksurface 2 of a kitchen.

This cooking top 1 is essentially composed of a glass-ceramic plate or hob 3 and of a prefabricated assembly 4 according to the invention which is fastened to a metal base 5, of rectangular cross section, by means of screws (not shown).

Heating elements (not shown) are fastened, in a manner known per se, to this base 5.

The combination of the prefabricated assembly according to the invention and the metal base therefore substitutes, at least from the standpoint of the enclosure function, for a metal frame used according to the prior art. A frame 6 made of a plastic, especially one filled with glass fibres, possibly like the plastics mentioned below, constitutes the support for the prefabricated assembly according to the invention.

This frame 6 essentially comprises three parts, namely the vertical side walls 61, 62, the outer peripheral part 63 which surrounds the glass-ceramic hob 3, being directly in contact with it, and a plane part 64 which extends approximately in the main plane of the glass-ceramic hob 3.

This plane part 64 has apertures, the function of which will be explained below.

Extending around the entire periphery of the frame 6 is a silicone profile 7. This has the shape of a lip 71 for the part directly in contact with the upper part of the worksurface. This lip 71 has the function of ensuring a very clearly defined interface between the frame 6 and the upper part of the worksurface, that is to say, inter alia, to ensure sealing with respect to liquids and with respect to food likely to be nearby.

Moreover, the curved shape of the lip 71 gives it an aesthetic appearance.

The silicone profile 7 has, in a vertical part thereof, tabs 72, 73 in contact, on the one hand, with the entire height of the vertical side walls 61, 62 of the frame 6 and, on the other hand, with the entire height of the worksurface. The elastic nature of the silicone makes it possible for these tabs 72, 73 to be deformed when inserting the cooking top into the worksurface and therefore to ensure that these two elements are completely immobilized, with a gap being formed between them.

Removal of the cooking top is also very easy, without running the risk of damaging the frame 6 and/or the worksurface 2.

As regards the plane part 64 of the frame, this has two circular apertures 65 and one rectangular aperture 66.

Through the two circular apertures 65 are snap-fastened, or preferably overmolded onto the frame, silicone control knobs 67 which, once they have been pushed in, make it possible to operate the heating members (not shown).

Placed below the rectangular aperture 66 is a digital-type display which makes it possible to display the time and/or programmed duration of a heating cycle of at least one of the heating members. It may also indicate which heating member is in operation if the hob is powered, the temperature of the heating member(s) etc.

Finally, under this plane part, opposite the apertures described, is encapsulated, using silicone, a substrate 68 on which conducting tracks are etched, the electrical supply to the various members being established via these conducting tracks.

Figure 2A:
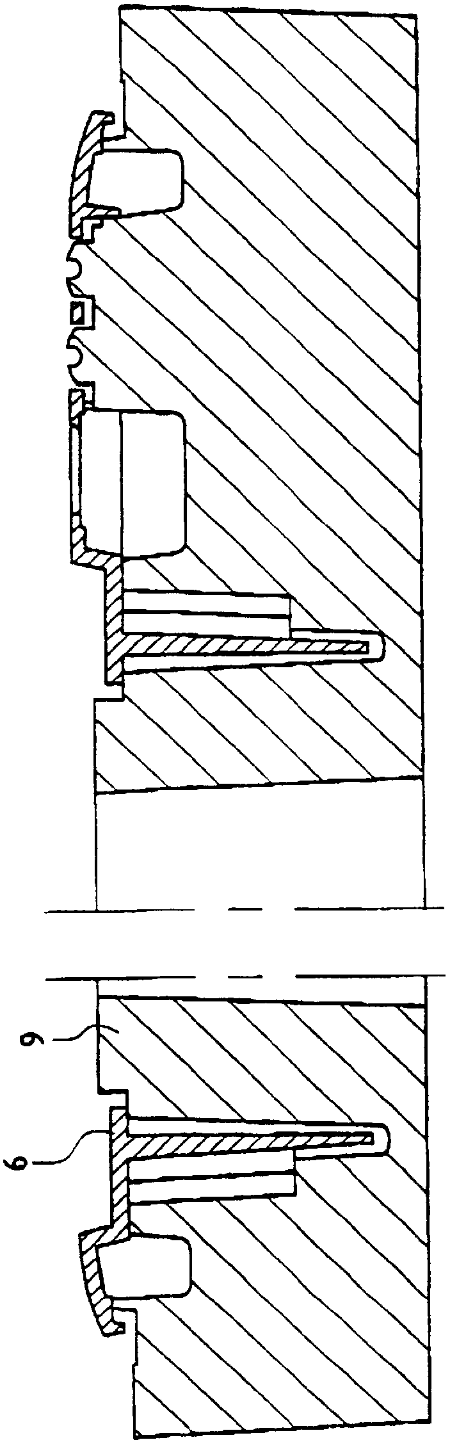
FIGS. 2*a* to 2*e*: the various steps in the process for manufacturing a second prefabricated assembly according to the invention.
Figure 2B:
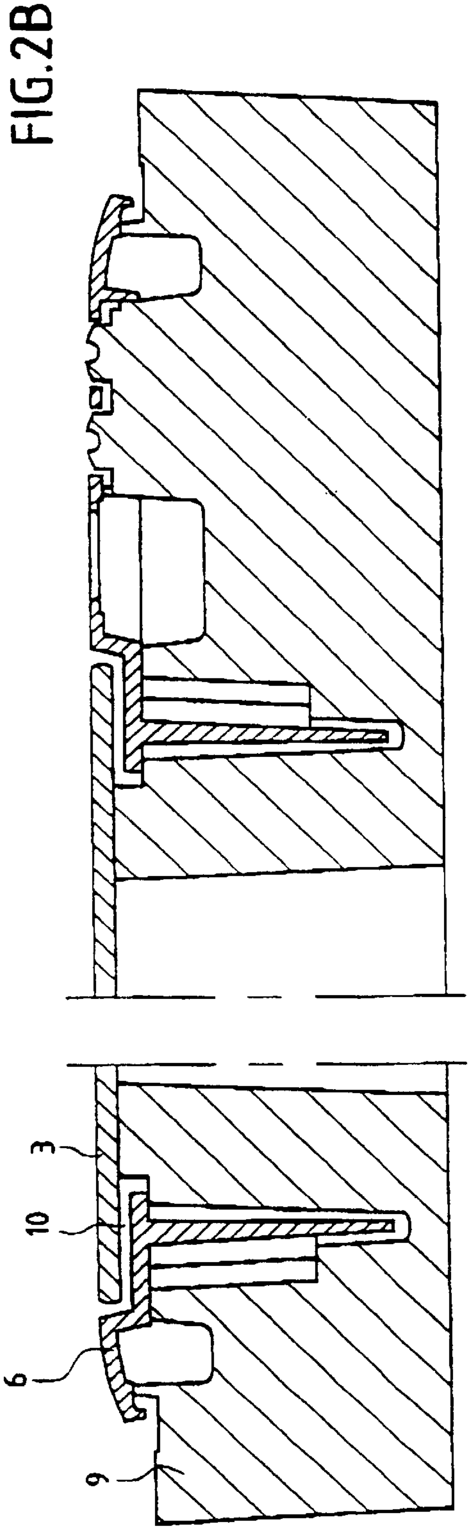
Figure 2C:
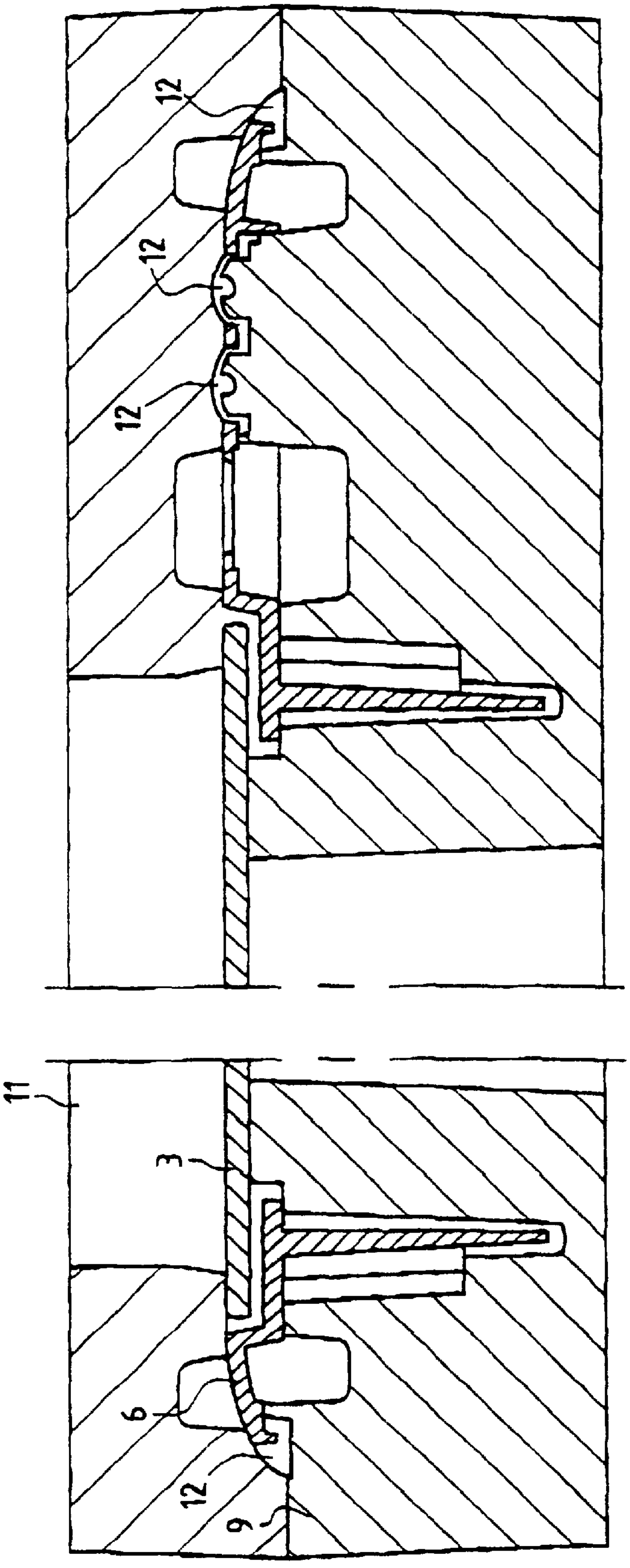
Figure 2D:
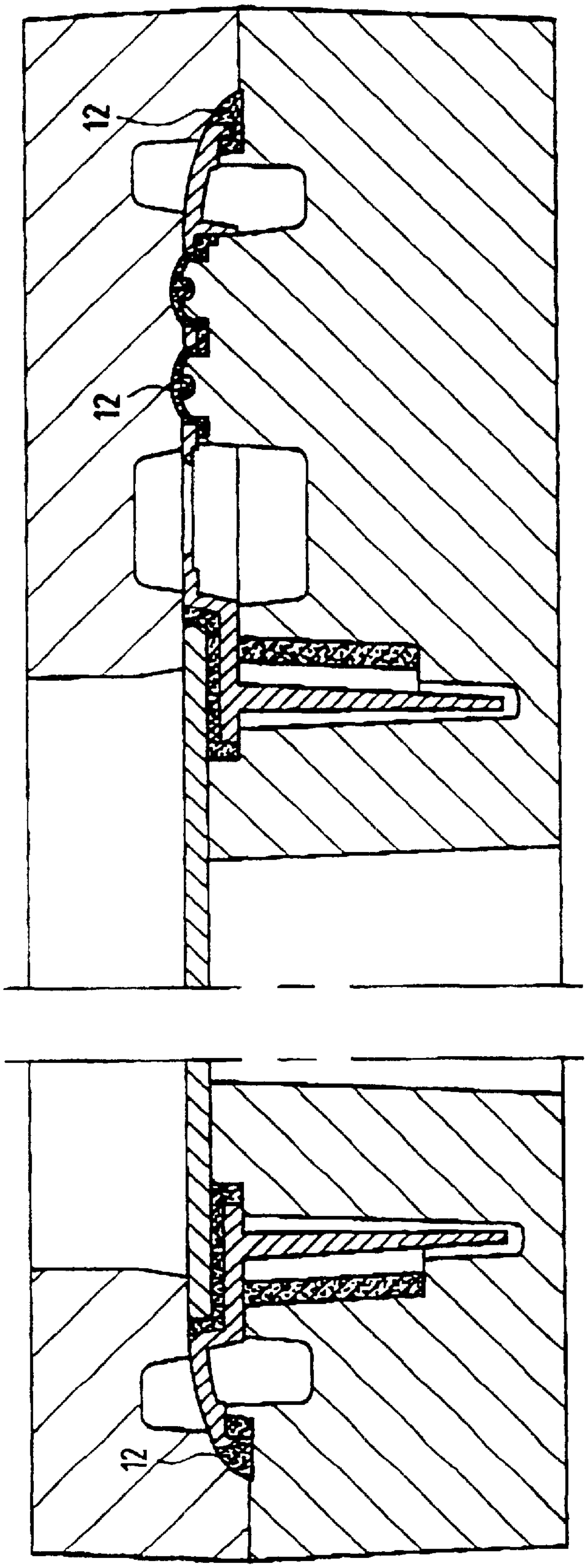
Figure 2E:
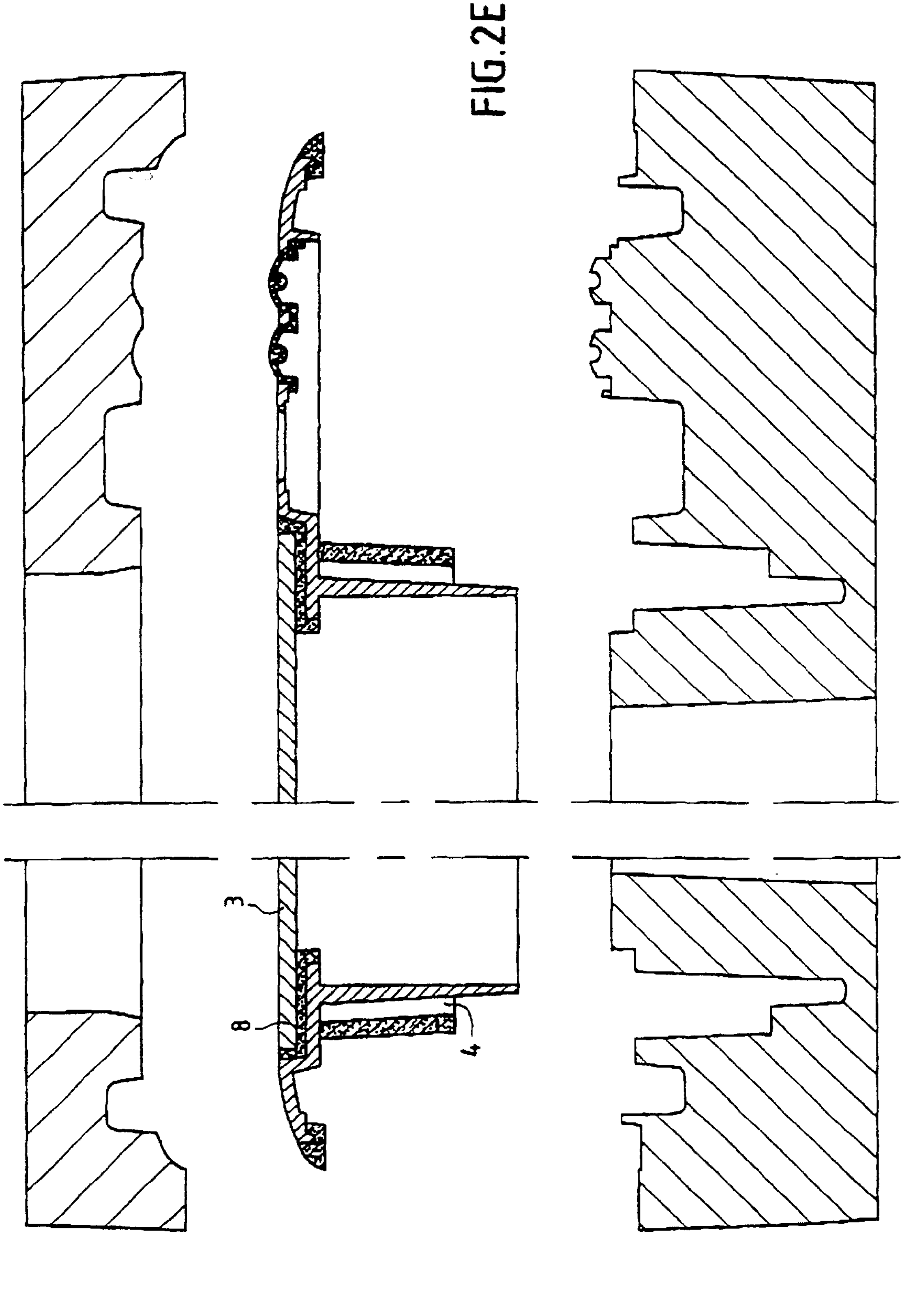

FIGS. 2*a* and 2*e* show the various successive steps in the process for manufacturing a second refabricated assembly according to the invention.

According to this second embodiment, the prefabricated assembly 4 and the glass-ceramic hob 3 are joined together via a silicone seal 8.

FIG. 2*a* relates to the initial step of placing a molded frame 6 in a punch 9. This molded frame 6 has a similar shape and chemical nature as that in FIG. 1.

FIG. 2*b* shows the glass-ceramic plate 3 placed in the punch 9, so as to be slightly above the frame 6, leaving a gap 10.

Once the two aforementioned parts have been placed in the punch 9, a die 11 is applied against the punch 9 and, at certain places, against the plate 3 and the frame 6 in such a way that closed injection channels 12 are created, as shown in FIG. 2*c*.

Silicone is then injected into these channels 12 by means of a suitable device.

Once the channels 12 have been completely filled with silicone material (as shown in FIG. 2*d*), the injection is stopped and this same material is then cured using a high-frequency technique lasting for a time of 0.5 to 2 minutes, depending on the mass of silicone to be converted.

The die 11 is then released from the punch 9 and the prefabricated assembly is ejected, as shown in FIG. 2*e*.

Such a process has the advantage of being simple and quick to carry out. It is also advantageous insofar as new series, with new types of molded frame, may be easily produced without any additional production cost, it being easy to produce new die and/or punch tooling.

It goes without saying that many modifications may be made without thereby departing from the scope of the invention. Thus, any new plastic for the molded frame may be suitable as long as it withstands high temperatures, typically greater than 250° C.

Thus, for example, the plastic of the frame according to the invention may be chosen from polytbutyl terephthalate (PBT), polyphenylene sulphide (PPS), polyetheretherketone (PEEK), polyacrylate (PAR), polyethersulphone (PES), polyetherimide (PEI), polyamideimide (PAI), liquid-crystal polymer (LCP), polytetrafluoroethylene (PTFE), polyetherethersulphone (PEES), polyepoxides (EP) and, possibly, polysulphone (PSF), fluoropolymer resins (FEP, such as, for example, PTEFE, PFA, ETFE, etc.), polythioethersulphone (PTES), thermoplastic polyimide (TPI), crosslinked polyimide (CLPI), polyetherketone (PEK), polyethernitrile (PEN), polycyclohexylene terephthalate (PCT) and polyphthalamide (PPA).

For material cost reasons, the frame may advantageously be chosen from polyester resins (UP).

Likewise, any other equivalent profile able to be injection-molded according to the invention falls within the scope of the invention as long as the analogous characteristics with regard to silicone, such as elasticity and resistance to high temperature, are fulfilled.

The elastomers sold respectively under the names VITON and KALREZ by DuPont de Nemours are thus perfectly suitable.

Likewise, the elastomers sold under the brand names FLUOREL and CHEMRAZ by 3M and Green Twin, respectively, are perfectly suitable.

What is claimed is:

1. Prefabricated assembly, for the production of a cooking top for fitting on a worksurface, comprising:

a glass-ceramic plate or hob and a frame comprising a first part extending around the periphery of the plate and a second part extending in a plane approximately vertical to the plate, wherein at least one of the first and second parts of the frame includes an overmolding made of an elastomer, said overmolding having a deformable tab which fills a gap formed between the frame and the worksurface for immobilizing the frame with respect to the worksurface.

2. Assembly according to claim 1, wherein the frame is made of plastic.

3. Assembly according to claim 1, wherein the frame is molded.

4. Assembly according to claim 2, wherein the frame is made of a polymer resin resistant to temperatures of at least 180° C.

5. Assembly according to claim 1, wherein the plastic frame is directly overmolded onto the glass-ceramic hob.

6. Assembly according to claim 1, wherein the frame and the glass-ceramic hob are joined together by a seal made of an elastomer, of a silicone type.

7. Assembly according to claim 1, wherein the frame has holes formed therein through which elastomer knobs are overmolded.

8. Assembly according to claim 1, wherein the overmolding is a profile.

9. Assembly according to claim 8, wherein each of the two parts of the frame includes an elastomer profile.

10. Assembly according to claim 8, wherein the elastomer profile of a part of the frame which extends in a plane approximately vertical to the plate comprises tabs having grooves formed therein.

11. Assembly according to claim 8, wherein the elastomer profile of a part of the frame which extends around the periphery of the plate has a lip.

12. Assembly according to claim 1, wherein the elastomer of the overmolding comprises a silicone elastomer.

13. A prefabricated assembly as claimed in claim 1, said overmolding having a curved lip for sealingly contacting an upper part of the worksurface on which the frame is mountable.

14. A cooking top incorporating a prefabricated assembly, which comprise:

a glass-ceramic plate or hob and a frame comprising a part extending around the periphery of the plate and another part extending in a plane approximately vertical to the plate, wherein at least one of the two parts of the frame includes an overmolding made of an elastomer, said overmolding having a deformable tab which fills a gap formed between the frame and the worksurface to immobilize the frame with respect to the worksurface, the frame being fastened to a base for supporting heating elements, the elements comprising at least one of a radiant element, a halogen element, at least one atmospheric-gas burner or at least one induction heating means.

15. Process for manufacturing a prefabricated assembly, intended for the production of cooking tops for mounting on a worksurface, the assembly comprising a glass-ceramic hob and a frame having a first part extending around the periphery of the plate and a second part extending in a plane approximately vertical to the plate, at least one of the parts including an overmolding having a deformable tab for filling a gap between the frame and the work station, which comprises:

a) introducing a molded frame into a punch for subsequently injecting an elastomer at a surface portion of at least one of the first and second parts of the frame;

b) placing the glass-ceramic hob in the punch so as to be positioned slightly above the molded frame;

c) closing the assembly thus formed by means of a die of a shape at least partly complementary to the punch;

d) injecting an elastomer into the channels formed by the gap between the punch and the die;

e) curing the elastomer; and then f) ejecting the assembly thus formed.

16. Process according to claim 15, wherein the frame comprises plastic.

17. Process according to claim 15, wherein the elastomer comprises silicone.

18. Process according to claim 16, which comprises high-frequency curing which is carried out during curing of the elastomer.

19. Prefabricated assembly for the production of a cooking top, comprising:

a glass-ceramic plate or hob and a frame comprising a first part extending around the periphery of the plate and a second part extending in a plane approximately vertical to the plate, wherein at least one of the first and second parts of the frame includes an overmolding made of a silicone type elastomer cured at high-frequency.

20. A cooking top incorporating a prefabricated assembly, which comprises:

a glass-ceramic plate or hob and a frame comprising a part extending around the periphery of the plate and another part extending in a plane approximately vertical to the plate, wherein at least one of two parts of the frame includes an overmolding made of a silicone type elastomer cured at high-frequency, the frame being fastened to a base for supporting heating elements, the elements comprising at least one of a radiant element, a halogen element, an atmospheric-gas burner or an induction heating means.

21. Process for manufacturing a prefabricated assembly for the production of cooking tops comprising a glass-ceramic hob and a frame having a first part extending around the periphery of the plate and a second part extending in a plane approximately vertical to the plate, which comprises:

(a) introducing a molded frame into a punch for subsequently injecting an elastomer at a surface portion of at least one of the first and second parts of the frame;

(b) placing the glass-ceramic hob in the punch so as to be positioned slightly above the molded frame;

(c) closing the assembly thus formed by means of a die of a shape at least partly complementary to the punch;

(d) injecting a silicone type elastomer into the channels formed by the gap between the punch and the die;

(e) curing the silicone type elastomer at high frequency; and then (f) ejecting the assembly thus formed.

* * * * *